UNITED STATES PATENT OFFICE.

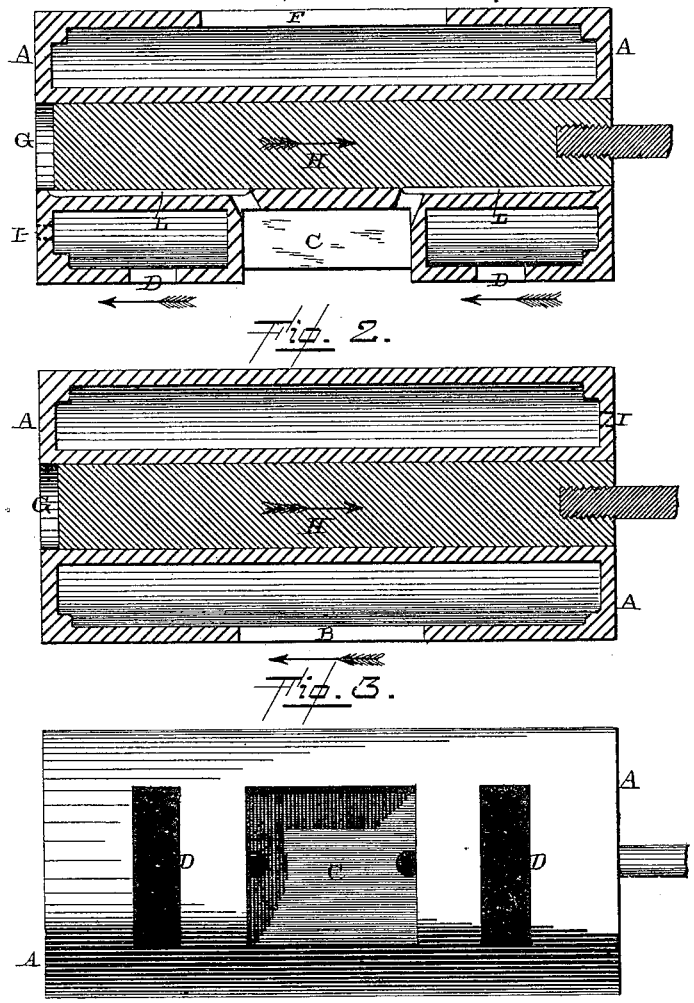

LORNS WIENMAN, OF COLUMBUS, OHIO.

STEAM-ACTUATED VALVE.

SPECIFICATION forming part of Letters Patent No. 273,655, dated March 6, 1883.

Application filed September 30, 1882. (Model.)

*To all whom it may concern:*

Be it known that I, LORNS WIENMAN, of Columbus, in the county of Franklin and State of Ohio, have invented certain new and useful Improvements in Steam-Actuated Valves; and I do hereby declare the following to be a full, clear, and exact description of the invention, such as will enable others skilled in the art to which it pertains to make and use it, reference being had to the accompanying drawings, which form part of this specification.

My invention relates to an improvement in steam-actuated valves; and it consists in the main valve having a smaller valve which is operated by the valve-rod placed inside of it, the main valve having a hole through each end, through which the steam escapes constantly into the ends of the steam-chest for the purpose of causing the steam to operate the valve.

Figure 1 is a vertical longitudinal section of my invention. Fig. 2 is a horizontal vertical section taken at right angles to Fig. 1, and Fig. 3 is an inverted view of the main valve. Fig. 4 is an end view.

A represents the main valve, which is made of cylindrical form, and which is prevented from rotating by means of a set-screw or other similar device, which is passed through the side of the steam-chest so as to catch in the slot D. This set-screw prevents the valve from turning and the parts from getting out of line with each other, so as to interfere with the operation of the valve. In the bottom of the main valve is made the recess C, into which the exhaust-steam passes from the cylinder in making its escape, and upon each side of this recess C are made the receiving-ports D, through which the steam passes to the cylinder. The steam passes down through the top of the steam-chest and through the slot F, which is made in the top of the valve, down through the receiving-ports into the cylinder. This slot F is made of sufficient length so that the steam will pass freely into the valve, no matter at which end of the cylinder it may have been moved by the steam. Through the center of this main valve is formed the central chamber or bore, G, in which is placed the smaller valve, H. This smaller valve, H, is connected to and operated by the valve-rod, and the two valves always move in opposite directions to each other. Through each end of the main valve is made the small hole I, which communicates with the steam-space inside of the main valve, and through these small holes I the steam is constantly escaping into the ends of the steam-chest. In the bore or central chamber of the main valve, at each end, is made a small port, L, which connects directly with the recess or exhaust-chamber formed in the bottom of the main valve. The central valve is intended to control these small ports L, and prevent the steam which has escaped through the hole I into the chamber from exhausting through the small port L, except when the main valve is about to reverse. As the two valves always move in opposite directions, the smaller valve keeps one of the ports closed while the other port at the opposite end of the main valve is open, so as to allow the steam from that end of the cylinder to escape. The steam, in passing through the small opening I into the end of the steam-chest, causes a pressure upon the end of the main valve A sufficient to force the valve toward the other end of the steam-chest as long as the central valve keeps the port L closed at the end of the chest from which the main valve is moving. The main valve continues to move toward the opposite end of the chest until the valve-rod strikes against a collar, in the usual manner, and shifts the central valve, when the port L, which was closed, is opened, and the steam then escapes through the opening I at that end of the main valve and starts the main valve in the opposite direction.

This valve is especially intended for use in steam-pumps, and owing to the construction above described is always prevented from sticking in the chest in such a manner as to interfere with the operation of the engine.

Having thus described my invention, I claim—

The hollow main valve having a central bore or chamber in which the steam-passages L are formed, and having an opening, I, through each end, in combination with a solid plug-valve, H, which has a reciprocating motion independently of the valve A, and which is made to alternately open and close the passages L, substantially as shown and described.

In testimony whereof I affix my signature in presence of two witnesses.

LORNS WIENMAN.

Witnesses:
W. H. KERN,
F. A. LEHMANN.